(12) United States Patent
Cohen

(10) Patent No.: US 10,431,215 B2
(45) Date of Patent: Oct. 1, 2019

(54) SYSTEM AND METHOD OF CONVERSATIONAL ADJUSTMENT BASED ON USER'S COGNITIVE STATE AND/OR SITUATIONAL STATE

(71) Applicant: VoiceBox Technologies Corporation, Bellevue, WA (US)

(72) Inventor: Philip R. Cohen, Deer Harbor, WA (US)

(73) Assignee: Voicebox Technologies Corporation, Bellevue, WA (US)

( * ) Notice: Subject to any disclaimer, the term of this patent is extended or adjusted under 35 U.S.C. 154(b) by 0 days.

(21) Appl. No.: 15/370,268

(22) Filed: Dec. 6, 2016

(65) Prior Publication Data

US 2017/0162197 A1    Jun. 8, 2017

Related U.S. Application Data

(60) Provisional application No. 62/263,682, filed on Dec. 6, 2015.

(51) Int. Cl.
*G10L 15/22* (2006.01)
*G06F 3/01* (2006.01)
(Continued)

(52) U.S. Cl.
CPC .............. *G10L 15/22* (2013.01); *G06F 3/012* (2013.01); *G06F 3/013* (2013.01); *G10L 25/63* (2013.01);
(Continued)

(58) Field of Classification Search
None
See application file for complete search history.

(56) References Cited

U.S. PATENT DOCUMENTS 6,236,968 B1 * 5/2001 Kanevsky ............... G10L 17/26
704/275
6,598,018 B1 * 7/2003 Junqua .................... G10L 15/22
704/231
7,079,925 B2 * 7/2006 Kubota ............... B60R 16/0231
340/438

(Continued)

FOREIGN PATENT DOCUMENTS

CN        1627915 A      6/2005
CN      103442201 A     12/2013

OTHER PUBLICATIONS

Chinese First Office Action dated Apr. 8, 2019 from corresponding Chinese Patent Application No. 201680071492.0, 12 pages.

*Primary Examiner* — Jonathan C Kim
(74) *Attorney, Agent, or Firm* — Ohlandt, Greeley, Ruggiero & Perle, L.L.P.

(57) ABSTRACT

A system and method is provided for adjusting natural language conversations between a human user and a computer based on the human user's cognitive state and/or situational state, particularly when the user is operating a vehicle. The system may disengage in conversation with the user (e.g., the driver) or take other actions based on various situational and/or user states. For example, the system may disengage conversation when the system detects that the driving situation is complex (e.g., car merging onto a highway, turning right with multiple pedestrians trying to cross, etc.). The system may (in addition or instead) sense the user's cognitive load and disengage conversation based on the cognitive load. The system may alter its personality (e.g. by engaging in mentally non-taxing conversations such as telling jokes based on situational and/or user states.

25 Claims, 5 Drawing Sheets

(51) Int. Cl.
*G10L 25/63* (2013.01)
*B60R 16/037* (2006.01)
*G10L 15/18* (2013.01)

(52) U.S. Cl.
CPC ....... *B60R 16/0373* (2013.01); *G10L 15/1815* (2013.01); *G10L 2015/223* (2013.01); *G10L 2015/227* (2013.01); *G10L 2015/228* (2013.01)

(56) References Cited

U.S. PATENT DOCUMENTS

| | | | | |
|---|---|---|---|---|
| 7,124,027 | B1* | 10/2006 | Ernst, Jr. | B60W 30/09 701/301 |
| 7,437,488 | B2* | 10/2008 | Ito | B60R 16/0373 710/15 |
| 8,022,831 | B1* | 9/2011 | Wood-Eyre | B60T 7/14 180/272 |
| 8,140,335 | B2* | 3/2012 | Kennewick | G06Q 30/0261 704/257 |
| 8,214,219 | B2* | 7/2012 | Prieto | B60N 2/002 381/58 |
| 8,311,827 | B2* | 11/2012 | Hernandez | G10L 15/1822 704/251 |
| 8,825,304 | B2* | 9/2014 | Horvitz | G06N 20/00 701/45 |
| 8,862,317 | B2* | 10/2014 | Shin | B60K 28/06 701/36 |
| 9,085,303 | B2* | 7/2015 | Wolverton | B60K 35/00 |
| 9,123,345 | B2 | 9/2015 | Khanna | |
| 9,196,248 | B2* | 11/2015 | Fischer | G10L 15/22 |
| 9,651,395 | B2* | 5/2017 | Rosario | G01C 21/3602 |
| 9,701,307 | B1 | 7/2017 | Newman | B60W 50/16 |
| 2001/0040590 | A1* | 11/2001 | Abbott | G06F 1/163 715/700 |
| 2002/0083025 | A1* | 6/2002 | Robarts | G06F 1/163 706/12 |
| 2003/0096594 | A1* | 5/2003 | Naboulsi | B60R 11/02 455/411 |
| 2003/0181822 | A1* | 9/2003 | Victor | A61B 3/113 600/558 |
| 2004/0044516 | A1 | 3/2004 | Kennewick et al. | |
| 2004/0122673 | A1* | 6/2004 | Park | G10L 15/22 704/270 |
| 2004/0209594 | A1* | 10/2004 | Naboulsi | B60R 11/0264 455/404.1 |
| 2006/0106615 | A1* | 5/2006 | Tateishi | G01C 21/3629 704/275 |
| 2006/0190822 | A1* | 8/2006 | Basson | G06Q 10/10 715/700 |
| 2006/0287787 | A1* | 12/2006 | Engstrom | G01C 21/26 701/36 |
| 2006/0287850 | A1* | 12/2006 | Morikawa | G10L 15/22 704/200 |
| 2007/0032929 | A1* | 2/2007 | Yoshioka | G07C 5/008 701/33.4 |
| 2007/0041552 | A1* | 2/2007 | Moscato | H04M 1/6075 379/214.01 |
| 2007/0063854 | A1* | 3/2007 | Zhang | B60W 40/09 340/576 |
| 2007/0094033 | A1* | 4/2007 | Nagashima | G10L 15/22 704/272 |
| 2007/0182529 | A1* | 8/2007 | Dobler | B60K 28/06 340/438 |
| 2008/0119994 | A1* | 5/2008 | Kameyama | B60W 40/08 701/48 |
| 2008/0186382 | A1* | 8/2008 | Tauchi | G01S 13/89 348/148 |
| 2008/0291032 | A1* | 11/2008 | Prokhorov | B60K 28/066 340/576 |
| 2009/0234552 | A1* | 9/2009 | Takeda | B60W 30/16 701/96 |
| 2010/0076273 | A1* | 3/2010 | Shigetou | A61B 5/18 600/300 |
| 2010/0134302 | A1* | 6/2010 | Ahn | A61B 5/165 340/576 |
| 2010/0179764 | A1* | 7/2010 | Kuramori | A61B 5/0488 702/19 |
| 2010/0182141 | A1* | 7/2010 | Yoon | B60W 40/09 340/439 |
| 2010/0241021 | A1* | 9/2010 | Morikawa | A61B 5/048 600/544 |
| 2010/0299000 | A1* | 11/2010 | Nakamura | B60R 1/00 701/1 |
| 2011/0043635 | A1* | 2/2011 | Fujita | B60W 40/09 348/149 |
| 2011/0112827 | A1 | 5/2011 | Kennewick et al. | |
| 2011/0143726 | A1* | 6/2011 | de Silva | G01C 21/3688 455/414.1 |
| 2011/0160964 | A1* | 6/2011 | Obradovich | G06F 7/00 701/41 |
| 2011/0195699 | A1* | 8/2011 | Tadayon | H04B 5/0062 455/418 |
| 2011/0224875 | A1* | 9/2011 | Cuddihy | B60K 28/06 701/42 |
| 2012/0041633 | A1* | 2/2012 | Schunder | B60K 35/00 701/29.2 |
| 2012/0075122 | A1* | 3/2012 | Whitlow | A61B 5/18 340/963 |
| 2012/0226413 | A1* | 9/2012 | Chen | B60R 16/037 701/36 |
| 2013/0021463 | A1* | 1/2013 | Hatakeyama | A61B 5/18 348/78 |
| 2013/0030811 | A1 | 1/2013 | Olleon | |
| 2013/0132434 | A1* | 5/2013 | Scofield | G08G 1/0112 707/771 |
| 2013/0144462 | A1* | 6/2013 | Ricci | H04W 4/90 701/1 |
| 2013/0204455 | A1* | 8/2013 | Chia | G07C 5/008 701/1 |
| 2013/0307771 | A1* | 11/2013 | Parker | G06F 3/013 345/158 |
| 2013/0322665 | A1* | 12/2013 | Bennett | G08G 1/096855 381/300 |
| 2014/0028542 | A1* | 1/2014 | Lovitt | G06F 3/017 345/156 |
| 2014/0125474 | A1* | 5/2014 | Gunaratne | G08G 1/163 340/439 |
| 2014/0236386 | A1* | 8/2014 | Yoshizawa | B60W 30/08 701/1 |
| 2014/0236472 | A1* | 8/2014 | Rosario | G01C 21/3602 701/400 |
| 2014/0240086 | A1* | 8/2014 | Van Wiemeersch | B60R 25/25 340/5.51 |
| 2014/0309864 | A1* | 10/2014 | Ricci | H04W 4/21 701/36 |
| 2014/0357295 | A1* | 12/2014 | Skomra | H04W 4/02 455/456.1 |
| 2014/0368644 | A1* | 12/2014 | Seok | G06K 9/00845 348/143 |
| 2015/0039316 | A1* | 2/2015 | Tzirkel-Hancock | G06F 3/167 704/275 |
| 2015/0051826 | A1* | 2/2015 | Basson | G01C 21/3697 701/437 |
| 2015/0091740 | A1* | 4/2015 | Bai | G08B 21/06 340/901 |
| 2015/0094899 | A1* | 4/2015 | Hackenberg | B60W 50/082 701/23 |
| 2015/0120081 | A1* | 4/2015 | Forcke | B60W 40/08 701/1 |
| 2015/0125126 | A1* | 5/2015 | Dreuw | B60W 40/08 386/226 |
| 2015/0160019 | A1* | 6/2015 | Biswal | G01C 21/26 701/1 |
| 2015/0266377 | A1* | 9/2015 | Hampiholi | B60K 35/00 455/466 |
| 2015/0276424 | A1* | 10/2015 | Kwon | G01C 21/3608 704/275 |
| 2015/0328985 | A1* | 11/2015 | Kim | H04N 5/23229 180/272 |

(56) References Cited

U.S. PATENT DOCUMENTS

| | | | |
|---|---|---|---|
| 2015/0331238 A1* | 11/2015 | Roth | B60K 37/00 348/115 |
| 2016/0009295 A1* | 1/2016 | Chun | A61B 5/6893 701/32.9 |
| 2016/0039424 A1* | 2/2016 | Hong | B60W 40/08 701/2 |
| 2016/0046294 A1* | 2/2016 | Lee | B60W 40/08 340/576 |
| 2016/0050315 A1* | 2/2016 | Malhotra | H04M 3/436 455/414.1 |
| 2016/0088469 A1* | 3/2016 | Racha | H04W 4/046 455/418 |
| 2016/0090097 A1* | 3/2016 | Grube | B60W 40/08 340/576 |
| 2016/0104486 A1* | 4/2016 | Penilla | H04L 67/12 704/232 |
| 2016/0236690 A1* | 8/2016 | Juneja | G06F 3/16 |
| 2016/0250968 A1* | 9/2016 | Shirakata | B60W 50/16 340/576 |
| 2016/0288707 A1* | 10/2016 | Matsumura | B60Q 9/00 |
| 2016/0362112 A1* | 12/2016 | Brewer | B60K 28/06 |
| 2016/0362113 A1* | 12/2016 | Takaso | B60W 10/18 |
| 2016/0375768 A1* | 12/2016 | Konet | B60K 35/00 348/148 |
| 2017/0008534 A1* | 1/2017 | Nakatsuka | B60K 28/06 |
| 2017/0021837 A1* | 1/2017 | Ebina | B60K 28/06 |
| 2017/0043782 A1* | 2/2017 | Farrell | B60W 40/08 |
| 2017/0066450 A1* | 3/2017 | Ko | B60W 50/0098 |
| 2017/0080856 A1* | 3/2017 | Enomoto | B60C 9/00 |
| 2017/0110022 A1* | 4/2017 | Gulash | G09B 9/052 |
| 2017/0158202 A1* | 6/2017 | Yang | B60W 40/08 |
| 2017/0158206 A1* | 6/2017 | Obradovich | G08G 1/166 |
| 2017/0182956 A1* | 6/2017 | Naboulsi | B60R 11/0264 |
| 2017/0303842 A1* | 10/2017 | Yoshida | A61B 5/0476 |

\* cited by examiner

SYSTEM AND METHOD OF CONVERSATIONAL ADJUSTMENT BASED ON USER'S COGNITIVE STATE AND/OR SITUATIONAL STATE

CROSS-REFERENCE TO RELATED APPLICATIONS

This application claims the benefit of U.S. Provisional Patent Application Ser. No. 62/263,682, filed Dec. 6, 2015, entitled "SYSTEM AND METHOD OF CONVERSATIONAL ADJUSTMENT BASED ON USER'S COGNITIVE STATE AND/OR SITUATIONAL STATE", which is hereby incorporated herein by reference in its entirety.

FIELD OF THE INVENTION

The invention relates to a system and method of adjusting natural language conversations between a human user and a computer based on the human user's cognitive state and/or situational state, particularly when the user is operating a vehicle.

BACKGROUND OF THE INVENTION

Facilitating human to machine interactions in a natural manner is a difficult problem. Both non-voice and certain voice interfaces tend to be overly structured and require some level of familiarity with the interfaces. An ability for a human to interact with machines using natural language utterances in various contexts remains a desirable goal. However, human interaction with machines in various contexts can create a cognitive load that may interfere with other tasks, such as operating a vehicle. Thus, a system's determining when system-human conversation should be delayed, prevented or otherwise altered would be desirable.

SUMMARY OF THE INVENTION

The invention addressing a potential excess cognitive load caused by the user's engaging in human-computer interaction relates to a system and method of adjusting natural language conversations between a human user and a computer based on the human user's cognitive state and/or situational state, according to an implementation of the invention.

An in-vehicle conversational system (such as in an automobile) may take one or more actions in response to various situational and/or user states. For instance, the system may disengage in conversation with a human user (e.g., the driver), alter its personality for interaction with the driver, provide alerts to the driver, and/or take other actions.

In an implementation, the system may disengage conversation when it detects that the driving situation is complex (e.g., car merging onto a highway, turning right with multiple pedestrians trying to cross, etc.) or otherwise when dangerous conditions are present (e.g., accident or road work nearby, inclement weather and road conditions, etc.). The system may sense various situations through GPS, computer vision, radar sensors, traffic data, weather data, and/or other information. Conversation may be disengaged by terminating voice input capability to the system, permitting voice input but delaying a response to the voice input, and/or otherwise disrupting or altering normal conversation from the system to the user. When the driving situation returns to a normal state, the system may re-engage the conversation. If a conversation was disengaged during a dialog, the system may maintain the context and any utterance that was received before or during the delay, so that when the conversation is re-engaged, the system (and user) is able to resume the conversation without the user having to repeat any utterances. The system may do so by adding any of the relevant utterances and context onto a conversation stack.

Alternatively or additionally, the system may disengage conversation when it determines that the user's cognitive load is such that the user should concentrate on driving, rather than operating an NLP system. The system may assess the user's cognitive load based on sensor information relating to the user. For instance, the sensor information may be used to assess a driver's voice through voice analysis, perspiration through galvanic skin response electrodes, assess alertness or attention via pupil analysis based on images from interior cameras, and/or other user sensor information used to assess a driver's state. The user's state may also be inferred from vehicular sensor information (e.g., vehicle is veering in and out of road travel lanes) and from historic models of user behavior or physiological states. For instance, a user's typical gaze while driving (as determined from an average of overall driving trips) may be compared to a user's current gaze to determine whether the user is paying attention to the road. If not, the system may disengage from conversation and/or take other actions.

In an implementation, the system may alter its behavior in response to certain situational or user states. For instance, the system may engage in mentally non-taxing conversations (e.g., telling jokes) when the user is detected via various sensors to be sleepy. In some instances, the system may cause natural language alerts to be provided to the user (e.g., "maybe you should pull over and get some coffee") when the user is determined to be sleepy.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION OF THE INVENTION

The invention described herein relates to a system and method of adjusting natural language conversations between a human user and a computer based on the human user's cognitive state and/or situational state. As used hereinafter, "human user" and "user" will be used interchangeably throughout. The system may adjust conversation of an NLP system depending on a user's cognitive state and/or situational state. This allows the system to reduce, enhance, terminate, or take other adjustment actions with respect to conversations with the user depending on whether (for example) the user is distracted and/or dangerous situational conditions have been detected.

Various examples used herein will relate to assessments of a user's cognitive state and/or situational state and adjusting an NLP system's conversation with the user while the user is operating a vehicle. The vehicle may include, without limitation, an automobile, an airplane, a train, a bus, a boat, and/or other vehicle that can be operated by a user. The examples used throughout this disclosure are intended to illustrate, for convenience and clarity, reducing instances of distracted driving (e.g., by reducing or eliminating the user's ability to speak to an NLP system) or otherwise enhancing a vehicle operator's attention while operating a vehicle (e.g., by providing spoken or other alerts). However, these examples are non-limiting, as other uses and contexts of the system to adjust conversations between a user and a computer based on the a user cognitive state and/or a situational state may be used as well, as will be apparent based on the disclosure herein.

Exemplary System Architecture

Figure 1:
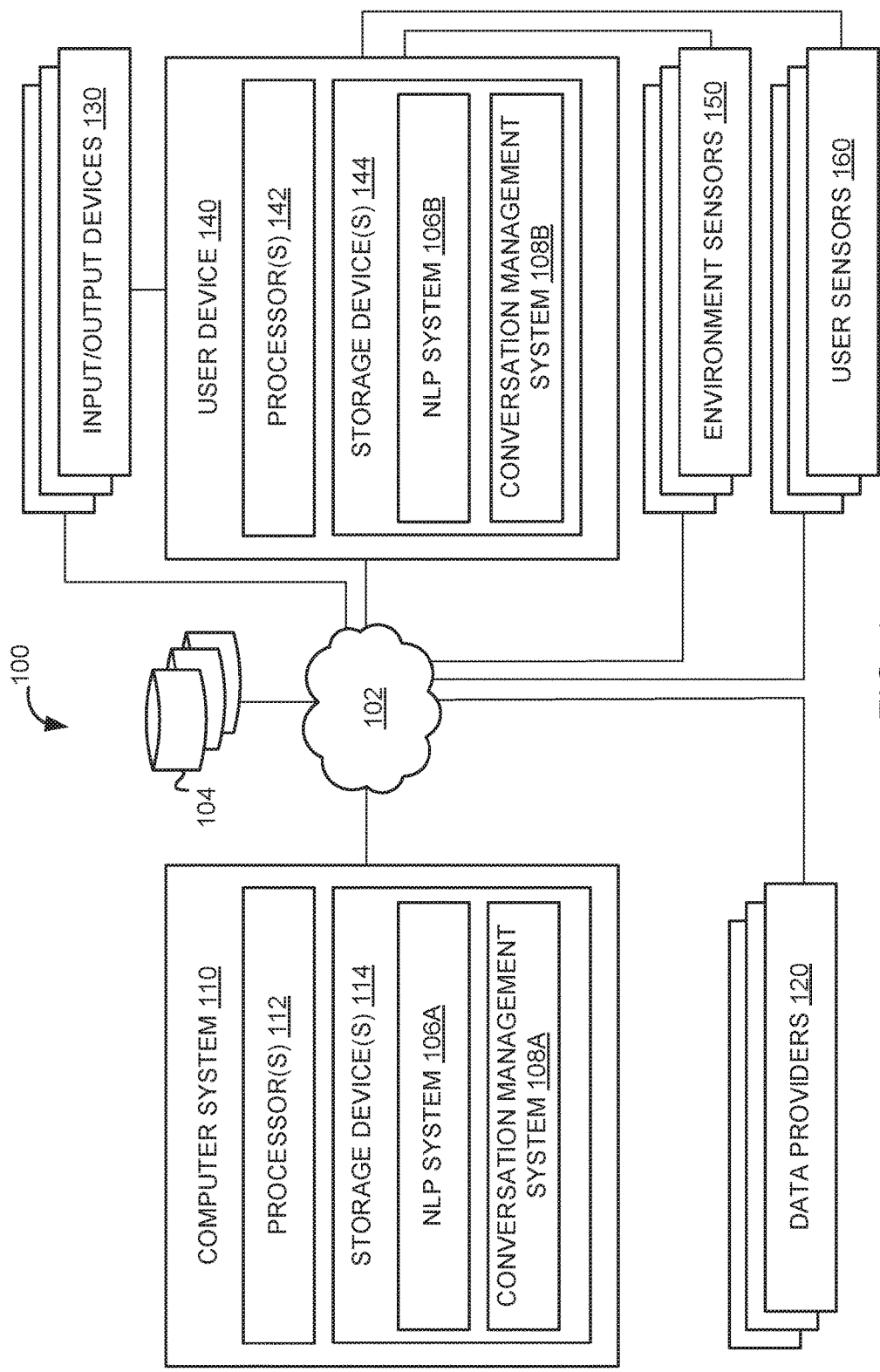
FIG. 1 illustrates a system for adjusting natural language conversations between a human user and a computer based on the human user's cognitive state and/or situational state, according to an implementation of the invention.

FIG. 1 illustrates a system for adjusting natural language conversations between a human user and a computer based on the human user's cognitive state and/or situational state, according to an implementation of the invention. In one implementation, system 100 may include a computer system 110, data providers 120, input/output devices 130, a user device 140, environment sensors 150, user sensors 160, a database 104, and/or other components.

Computer System 110

Computer system 110 may be configured as a server (e.g., having one or more server blades, processors, etc.), a gaming console, a handheld gaming device, a personal computer (e.g., a desktop computer, a laptop computer, etc.), a smartphone, a tablet computing device, and/or other device that can be programmed to adjust natural language conversations between a human user and a computer based on the human user's cognitive state and/or situational state.

Computer system 110 may include one or more processors 112 (also interchangeably referred to herein as processors 112, processor(s) 112, or processor 112 for convenience), one or more storage devices 114, and/or other components. Processors 112 may be programmed by one or more computer program instructions. For example, processors 112 may be programmed by NLP system 106A, conversation management system 108A, and/or other instructions that program computer system 110 to perform various operations, each of which are described in greater detail herein. As used herein, for convenience, the various instructions will be described as performing an operation, when, in fact, the various instructions program the processors 112 (and therefore computer system 110) to perform the operation.

Figure 2:
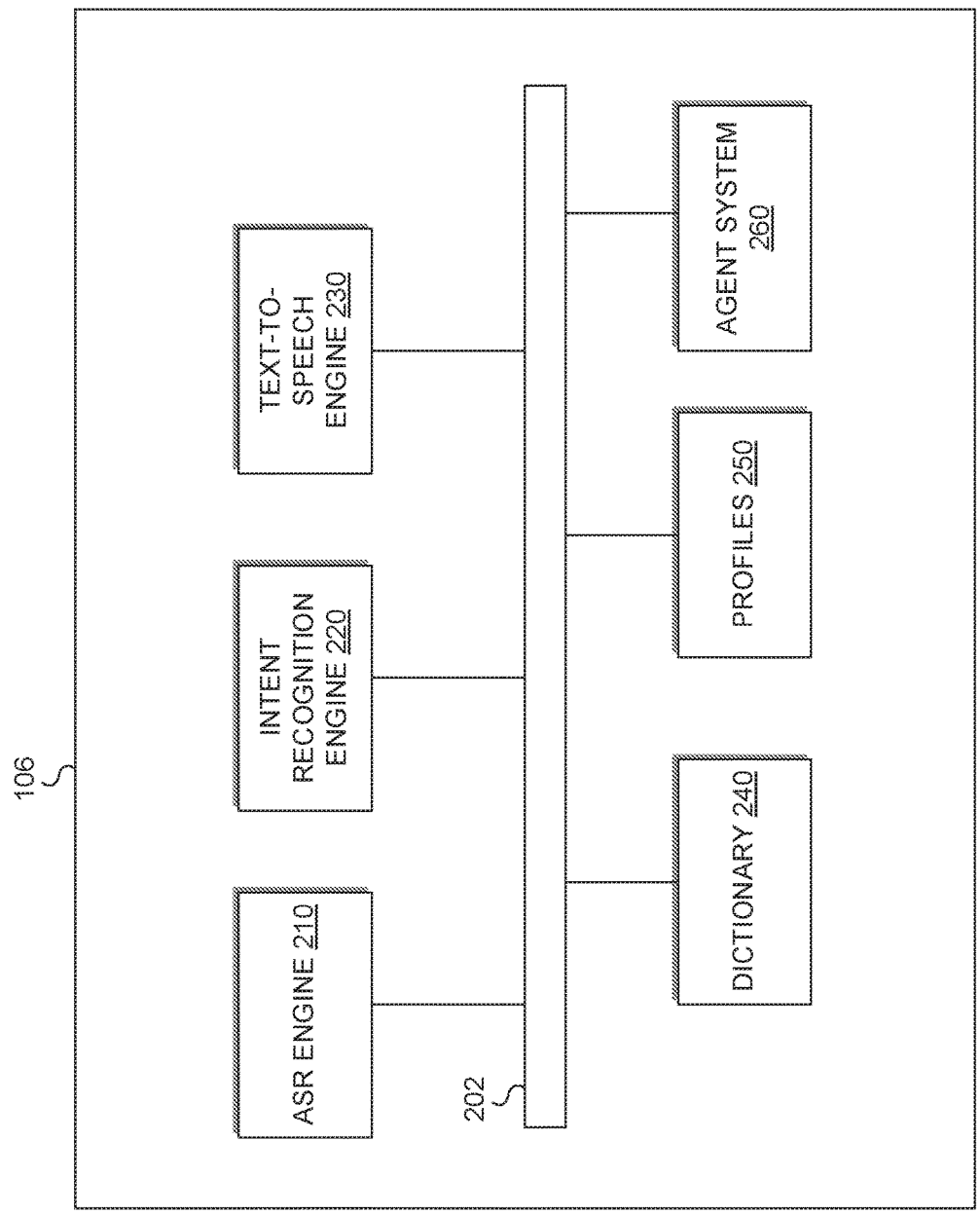
FIG. 2 depicts an NLP system configured to perform natural language processing on an utterance, according to an implementation of the invention.

NLP system 106A may perform at least some aspects of natural language processing on an utterance using all or a portion of the components of NLP system 106 illustrated in FIG. 2. In other words, computer system 110 may be programmed with some or all of the functions of NLP system 106 described with respect to FIG. 2. Conversation management system 108A may perform at least some aspects of conversation adjustment using all or a portion of the components of conversation management system 108 illustrated in FIG. 3. In other words, computer system 110 may be programmed with some or all of the functions of conversation management system 108 described with respect to FIG. 3.

Computer system 110 may be configured as a device remote from and communicating with (via network 102) user device 140. For example, computer system 110 may include a networked server (or other type) of computing device that is programmed to assist user device 140 adjust conversations with users by analyzing, in whole or in part, a user's cognitive state and/or situational state. In this sense, computer system 110 may receive some or all available sensor information via network 102 and assess the user's cognitive and/or situational state. As will be described below, however, some or all of the foregoing assessments may occur locally at user device 140 as well.

Data Providers 120,

Data providers 120 may provide data relevant to situational states. Such data may include, without limitation, traffic data (e.g., congestion information, road construction, etc.), weather data (e.g., forecasts for a given location, current weather conditions, etc.), vehicle-to-vehicle data sources (e.g., vehicle-to-vehicle communication information), vehicle-to-server data sources (e.g., vehicle sensor information communicated from vehicles to a server), and/or other information that may be used to assess a situation.

Input/Output Devices 130

Input/Output devices 130 may include devices configured to receive user inputs (e.g., user interface inputs, camera devices, microphones, etc.) and/or provide outputs (e.g., a speaker, a display—including screen displays, lights, and so on, a tactile actuator, etc.), and/or other devices that can receive inputs and/or provide outputs.

User Devices 140

User device 140 may be configured as an in-vehicle computer, server device, a gaming console, a handheld gaming device, a personal computer (e.g., a desktop computer, a laptop computer, etc.), a smartphone, a tablet computing device, and/or other device that can be programmed to adjust conversation between a user and the user device (or other device) based on the user's cognitive state and/or situational state.

User device 140 may include one or more processors 142 (also interchangeably referred to herein as processors 142, processor(s) 142, or processor 142 for convenience), one or more storage devices 144, and/or other components. Processors 142 may be programmed by one or more computer program instructions. For example, processors 142 may be programmed by NLP system 106B, conversation management system 108B, and/or other instructions that program computer system 110 to perform various operations, each of which are described in greater detail herein. As used herein, for convenience, the various instructions will be described as performing an operation, when, in fact, the various instructions program the processors 142 (and therefore user device 140) to perform the operation.

NLP system 106B may perform at least some aspects of natural language processing on an utterance using all or a portion of the components of NLP system 106 illustrated in FIG. 2. In other words, user device 140 may be programmed with some or all of the functions of NLP system 106 described with respect to FIG. 2. Conversation management system 108B may perform at least some aspects of conversation adjustment using all or a portion of the components of conversation management system 108 illustrated in FIG. 3. In other words, user device 140 may be programmed with some or all of the functions of conversation management system 108 described with respect to FIG. 3.

Environment Sensors 150

In an implementation, environment sensors 150 may measure or otherwise gather (e.g., sense) information relating to a situation associated with the user. In other words, environment sensors 150 may sense the (intra-vehicle and/or extra-vehicle) surroundings of a user but not direct measurements of the user himself (which the user sensors 160 sense). A given situation sensor 150 may include, without limitation, a vehicle state sensor (e.g., steering wheel sensor, throttle sensor, brake sensor, seatbelt sensor, etc.), a Global Positioning System ("GPS") device that provides location information, a camera directed to outside the vehicle (e.g., a lane keeping/warning system), a radar directed to outside the vehicle (e.g., a collision mitigation system, automatic radar, etc.), a thermometer (e.g., to sense freezing conditions), a rain sensor, and/or other sensor that can measure the environment associated with a user (e.g., surroundings of a vehicle operated by the user).

User Sensors 160

In an implementation, user sensors 160 may measure or otherwise gather information of a user. In other words, user sensors 160 may measure physiological and other characteristics of the user. A given user sensor 160 may include, without limitation, a camera directed toward the user (e.g., to measure the user's pupil, monitor the user's head movements, etc.), microphone (e.g., to measure the user's speech), galvanic skin response receptors (e.g., mounted on a steering wheel or other input), and/or other sensor that can measure a physiological characteristic of the user.

In some instances, a vehicle may incorporate (e.g., be manufactured to include) some or all of input/output devices 130, user device 140, environment sensors 150, user sensors 160, and/or other components of system 100. Likewise, user device 140 may incorporate (e.g., within a housing of user device 140) input/output devices 130, environment sensors 150, user sensors 160, and/or other components of system 100.

Although illustrated in FIG. 1 as a single component, computer system 110 and user device 140 may each include a plurality of individual components (e.g., computer devices) each programmed with at least some of the functions described herein. In this manner, some components of computer system 110 and/or user device 140 may perform some functions while other components may perform other functions, as would be appreciated. The one or more processors 112 may each include one or more physical processors that are programmed by computer program instructions. The various instructions described herein are exemplary only. Other configurations and numbers of instructions may be used, so long as the processor(s) 112 are programmed to perform the functions described herein.

Furthermore, it should be appreciated that although the various instructions are illustrated in FIG. 1 as being co-located within a single processing unit, in implementations in which processor(s) 112 includes multiple processing units, one or more instructions may be executed remotely from the other instructions.

The description of the functionality provided by the different instructions described herein is for illustrative purposes, and is not intended to be limiting, as any of instructions may provide more or less functionality than is described. For example, one or more of the instructions may be eliminated, and some or all of its functionality may be provided by other ones of the instructions. As another example, processor(s) 112 may be programmed by one or more additional instructions that may perform some or all of the functionality attributed herein to one of the instructions.

The various instructions described herein may be stored in a storage device 114, which may comprise random access memory (RAM), read only memory (ROM), and/or other memory. The storage device may store the computer program instructions (e.g., the aforementioned instructions) to be executed by processor 112 as well as data that may be manipulated by processor 112. The storage device may comprise floppy disks, hard disks, optical disks, tapes, or other storage media for storing computer-executable instructions and/or data.

The various components illustrated in FIG. 1 may be coupled to at least one other component via a network 102, which may include any one or more of, for instance, the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network. In FIG. 1, as well as in other drawing Figures, different numbers of entities than those depicted may be used. Furthermore, according to various implementations, the components described herein may be implemented in hardware and/or software that configure hardware.

The various databases (104, 332) described herein may be, include, or interface to, for example, an Oracle™ relational database sold commercially by Oracle Corporation. Other databases, such as Informix™, DB2 (Database 2) or other data storage, including file-based, or query formats, platforms, or resources such as OLAP (On Line Analytical Processing), SQL (Structured Query Language), a SAN (storage area network), Microsoft Access™ or others may also be used, incorporated, or accessed. The database may comprise one or more such databases that reside in one or more physical devices and in one or more physical locations. The database may store a plurality of types of data and/or files and associated data or file descriptions, administrative information, or any other data.

Natural Language Processing

FIG. 2 depicts an NLP system 106 configured to perform natural language processing on an utterance, according to an implementation of the invention. The input capabilities (e.g., whether or not NLP system 106 accepts and processes user speech) and/or the output capabilities (e.g., whether or not NLP system 106 responds to a user and how NLP system 106 responds) of NLP system 106 may be adjusted based on a user's cognitive state and/or situational state. With that in mind, a discussion of the operation of NLP system 106 follows.

NLP system 106 may include a an Automated Speech Recognition ("ASR") engine 210, an Intent Recognition Engine ("IRE") 220, text-to-speech engine 230, a dictionary 240, a user profile 250, an agent system 260, and/or other components. The components of NLP system 106 may communicate with one another via communication manager 202, which may mediate interactions between components of NLP system 106.

NLP system 106 may process an utterance encoded into audio to determine words or phrases from the utterance. Alternatively, NLP system 106 may process text that was already detected from the utterance. In whichever manner the utterance is received (e.g., whether as encoded audio or text), NLP system 106 may determine an intent of the utterance using the words or phrases, formulate requests based on its intent, and facilitate generating a response to or executing the request.

For example, in implementations in which an utterance is received as audio, ASR engine 210 may use words and phrases from dictionary 240 and information received from agent system 260 (discussed below) to recognize words from the utterance (i.e., the audio). The recognized words and phrases are processed by IRE 220, which determines the intent of the utterance and generates a request that corresponds to the utterance based on context, and information from agent system 260. The request may include a query (e.g., "what is the weather like in Seattle?") a command (e.g., "turn up the volume"), and/or other information.

To process the intent of the utterance, IRE 220 may use keywords within the utterance itself to identify context. For example, for the utterance "what is the weather like in Seattle," IRE 220 may determine that the context is weather and a subject is "Seattle." In some instances, the contextual information may be based on immediately prior utterances. In these instances, IRE 220 may generate a stack (also referred to herein as a "conversation stack") that stores (e.g., in Random Access Memory) information relating to one or more previous utterances in a given session (which may be defined by utterances received within a threshold time of one another or an immediately previous utterance). For example, a first utterance "what is the weather like in Seattle" may be followed up (after the computer's response) with a second utterance "book me a flight there." By itself, the second utterance "book me a flight there" may be non-specific because "there" is undefined in the second utterance. However, when processed as part of a stack that includes information relating to the first utterance "what is the weather like in Seattle," IRE 220 determines that "there" refers to "Seattle."

Alternatively or additionally, NLP system 106 may use agent system 260, which includes system and domain specific agents, that assists in ASR, intent recognition, request generation, and/or request response. Agent system 260 may use nonvolatile storage (e.g., storage device 114 or storage device 144) to store data, parameters, history information, and locally stored content provided in the system databases 104 or other data sources. User specific data, parameters, and session and history information that may determine the behavior of the agents are stored in one or more user profiles 250. For example, user specific speech patterns may assist in ASR, while user preferences and history may assist in contextual determinations and, therefore, intent recognition.

The system agent provides default functionality and basic services. A domain specific agent relates to a corresponding domain of information (e.g., a business listing domain may relate to business listings, a contacts domain may relate to user contacts, a shopping domain may relate to commerce, etc.).

Agent system 260 create queries to local databases or though data sources on the Internet or other networks. Commands typically result in actions taken by the device on which NLP system 106 operates, or to a remote device or data source.

In implementations in which a response to a request is desired, agent system 260 may create a response string for presentation to the user. The response string may be presented as text and/or as speech, in which case the string is sent to the text to speech engine 230 to be output by a speaker (whether an on-board or off-board speaker).

Text-to-speech engine 230 may convert text to speech, such as when information from NLP system 106 (e.g., responses to spoken queries) is to be presented to a user in speech format. Conventional text-to-speech processors may be used for such text-to-speech generation.

A more detailed description of NLP processing is described in U.S. patent application Ser. No. 10/452,147, entitled "Systems and Methods for Responding Natural Language Speech Utterance," filed on Jun. 3, 2003, the disclosure of which is incorporated in its entirety herein. NLP system 260 may use the foregoing and/or other types of NLP processing techniques and systems.

Furthermore, as previously noted, some or all aspects of the foregoing operations may be performed by a given component illustrated in FIG. 1. In particular, some or all aspects of the foregoing operations may be performed by computer system 110 and/or user device 140. In some instances, some operations relating to natural language processing may be performed by user device 140, while other operations are performed at computer system 110.

In some instances, the same operation relating to natural language processing may be performed by both user device 140 and computer system 110 (i.e., both user device 140 and computer system 110 may perform one or more of the operations relating to natural language processing). In implementations where NLP system 106 operates in a hybrid manner (e.g., one or more components of NLP system 106 are included in and operate at different remote devices such as computer system 110 and user device 140), communication manager 202 may mediate communication through a network, such as network 102.

For example, a version of ASR engine 210 operating and executing on user device 140 may convert spoken utterances into text, which is then provided to a version of IRE 220 operating and executing on computer system 110. Alternatively or additionally, a version of ASR engine 210 operating and executing on user device 140 may convert spoken utterances into text and a version of ASR engine 210 operating and executing on computer system 110 may also convert the spoken utterances into text, in which case one result may be chosen over.

A more detailed description of such hybrid natural language processing is disclosed in U.S. patent application Ser. No. 12/703,032, entitled "System and Method for Hybrid Processing in a Natural Language Voice Services Situation," filed on Feb. 9, 2010, the disclosure of which is incorporated in its entirety herein. The foregoing or other hybrid systems may be used for NLP system 106.

Figure 3:
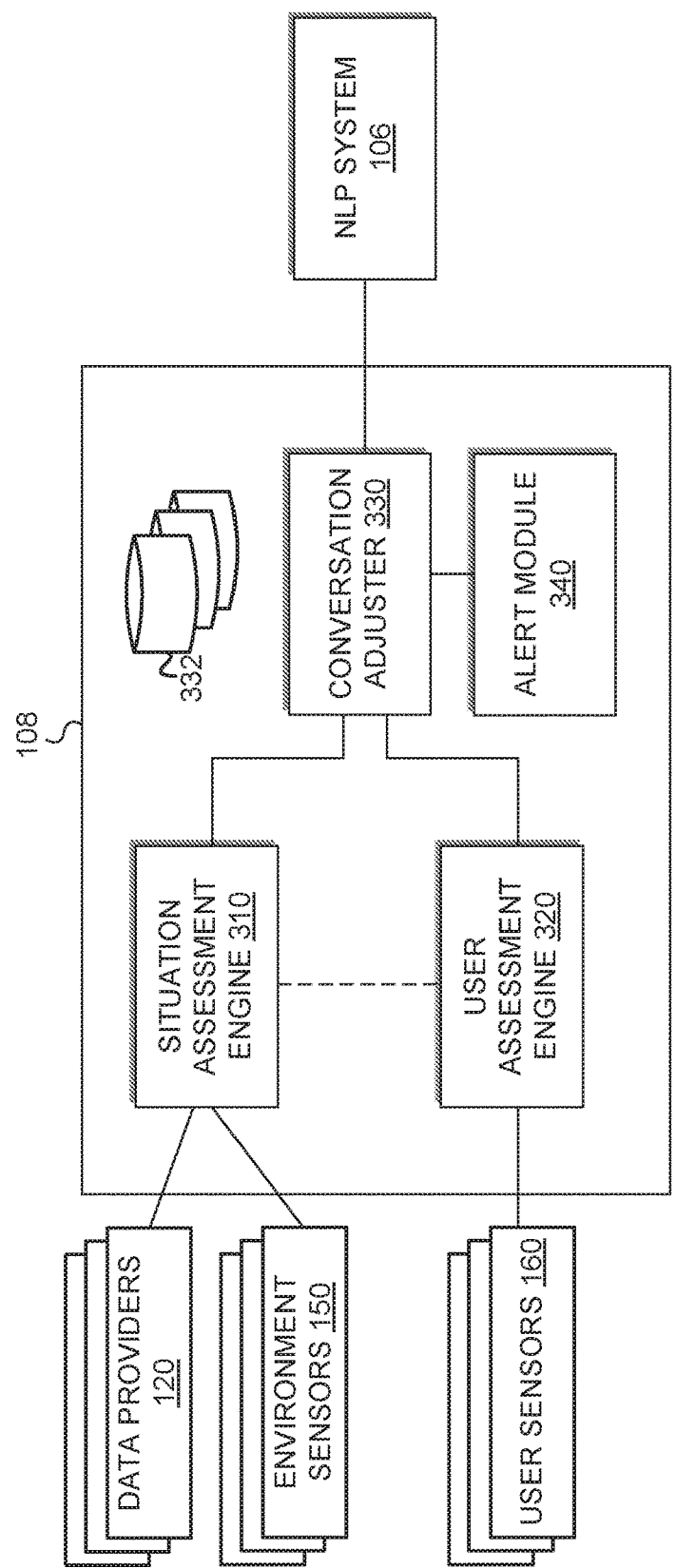
FIG. 3 depicts a conversation management system configured to assess a human user's cognitive state and/or a situational state and adjust natural language conversations from a computer based on the cognitive and/or situational state, according to an implementation of the invention.

Assessing a User Cognitive State and/or a Situational State and Adjusting Natural Language Conversations with a Computer FIG. 3 depicts a conversation management system 108 configured to assess a human user's cognitive state and/or a situational state and adjust natural language conversations from a computer based on the cognitive and/or situational state, according to an implementation of the invention. For example, conversation management system 108 may adjust the extent to which a user may interact with NLP system 106 based on a user's cognitive state and/or a situational state associated with the user. In a particular example, conversation management system 108 may turn off, delay, or otherwise alter natural language processing of in-vehicle NLP systems (e.g., an NLP system 106) if a user is distracted (e.g., to focus the user's attention toward driving and away from distracting activities). Alternatively or additionally, conversation management system 108 may cause in-device NLP systems (e.g., an NLP system 106 configured interfacing with the use as a personal digital assistant of a user's mobile device) to be turned off, delayed, or otherwise altered.

To achieve the foregoing and other uses, conversation management system 108 may include a situation assessment engine 310, a user assessment engine 320, a conversation adjuster 330, an adjustment rules database 332, an alert module 340, and/or other components.

Situation Assessment

Situation assessment engine 310 may receive third party information from data providers 120 and/or situation sensor information from environment sensors 150. In some instances, situation assessment engine 310 may determine a situational state based on individual (single) pieces of information (e.g., traffic data from data providers 120 or throttle data from a throttle sensor). In other instances, situation assessment engine 310 may fuse various third party information and/or various sensor information to determine an assessment of a situational state.

Whether individual or fused information is used, situation assessment engine 310 may apply rules from adjustment rules database 332 to generate a situation score, which may represent a state of the situation. The individual or fused information may be continuously monitored to update the state of the situation (e.g., continuously update the situation score). The term "continuously" is used herein to mean periodically perform an action until a terminating signal or event (e.g., a vehicle being placed in park or turned off) has occurred.

The state of the situation may include a level of hazard, or heightened attention (e.g. relative to routine driving conditions that does not have a hazard) required of a user, associated with operating a vehicle in the situation. For instance, an adjustment rule may specify that the act of merging onto a highway is hazardous or otherwise requires the attention of a user (who is driving). As such, situation assessment engine 310 may receive sensor information indicating that the vehicle is merging onto a highway (e.g., via GPS location information indicating that the vehicle is on or leaving an on-ramp) and determine a first situation score, specified by the adjustment rule. In another example, an adjustment rule may specify that sensor information indicating a potential imminent collision (e.g., via forward-looking cameras or radar systems) is more hazardous or otherwise requires more attention of the user and accordingly assign a second score (higher or lower than the first score, depending on the scoring system) indicating a greater hazard than merging onto a highway.

When fusing information, situation assessment engine 310 may generate a situation score based on a combination of third party and/or sensor information. In doing so, situation assessment engine 310 may weight a given situation score resulting from a given third party information or sensor information. For instance, extending the previous examples, information indicating that the vehicle is merging onto a highway and a potential imminent collision has been detected may be additive. That is, together the two situations are more dangerous than either alone. However, such danger or risk may not equal the sum of the individual dangers (e.g., the danger or risk may be less than or greater than the sum of the individual dangers). As such, the adjustment rules may specify weights for different combinations of third party or sensor information. Such weights and corresponding situation scores may be predefined in the adjustment rules, which may be informed by various predefined parameters. These parameters may, in turn, be defined based on risk tables associated with different types and combinations of activities and risks, which may be informed by statistical data (e.g., accident rates, fatality rates, etc.). In some instances, machine learning may be used to determine optimal combinations of weights, types of situation assessments, confidence scores or probability assignments in the various situation assessments.

Having described situational state assessment, attention will now be turned to non-limiting examples of different types of information that may be used to assess a situational state. In an implementation, situation assessment engine 310 may use third party data such as current or immediately in the future weather conditions at or near (e.g., within a predefined distance that is specified by a developer or others) a current location, hazards (e.g., construction, accident, disabled vehicle, aggressive driving detected) at or near a current location, and/or other third party data may be used to assess a situational state. For instance, a situation score may be adjusted based on nearby hazards, which may require the user's attention.

In an implementation, situation assessment engine 310 may use environment sensor information from environment sensors 150 to assess a situational state. For instance, situation assessment engine 310 may determine, based on in-vehicle sensor information, that a vehicle is in reverse or parking, changing lanes, about to make a turn (e.g., as determined from a turn signal indicator activation, navigation information, etc.), and/or other situations that may require user attention. Based on the situational state, situation assessment engine 310 may generate or update the situation score.

In some instances, situation assessment engine 310 may use location information to generate or update the situation score. For instance, the location information indicates the location of certain regions, when travelled through, require the user's attention. For example, the location information may indicate the location (e.g., an area defined by a center point coordinate and radius, bounded box using coordinates, etc.) of a school, hospital, fire station, pedestrian crosswalk, low speed limit (potentially indicating residential areas) and/or other location that would require the user's attention while operating a vehicle. When a vehicle operated by the user is within any of the foregoing regions (as determined from GPS or other location indicating device), situation assessment engine 310 may update the situation score accordingly.

In some instances, situation assessment engine 310 may use vehicle state information from environment sensors 150 as well. For instance, situation assessment engine 310 may update the situation score based on whether or not: a seatbelt has been fastened, vehicle maintenance is required (e.g., low tire pressure, engine trouble, etc.), vehicle is travelling at a high rate of speed (e.g., greater than a predefined speed or exceeding a posted speed limit by a certain rate of speed or percentage of the speed limit), and/or based on other vehicle state that may require the user's attention.

The foregoing are non-limiting examples used for explanation and not limitation. Situation assessment engine 310 may use combinations of the foregoing and/or other types of environment sensor information (including vehicle sensor information) to assess a situation such as by updating a situation score (or generating multiple situation scores for a given type of third party or sensor information).

User Assessment

In an implementation, user assessment engine 320 may use user sensor information from user sensors 160 to assess a user's cognitive state (e.g., the user's emotional state, whether the user is sleepy, intoxicated, or otherwise distracted). For example, user assessment engine 320 may use sensor information to generate a cognitive state score, in a manner similar to that described above with respect to situational state scores. Adjustment rules may include rules for scoring cognitive state for given types of sensor information, which may be informed by statistical analysis of risk factors of user cognitive states. For instance, sleepiness may present one level of risk while being distracted may present another level of risk. As such, different cognitive state scores may be assessed based on different levels of risk a given cognitive state presents. Furthermore, and also similar to that described above with respect to situational state scores, different cognitive states, when combined, may result in greater risk, which may be reflected in an overall cognitive state score that represents the greater risk. For example, a user who is sleepy and distracted may have a greater risk of being involved in a car accident than a user who is only sleepy or only distracted. Each sensor may generate a probabilistic assessment of a feature of the user's cognitive state (sleepiness, distraction, emotion (e.g. angry)), looking at dashboard, etc. The system will have learned weights to assign to such state assessments to predict a cognitive load score (e.g., low, medium, high load) along with risk.

Having described situational state assessment, attention will now be turned to non-limiting examples of different types of information that may be used to assess a situational state. For example, user assessment engine 320 may use sensor information (e.g., image data) from a camera to determine whether a user is sleepy based on sudden head movements, which may indicate sleepiness. Likewise, image data may be used to determine whether the user is sleepy (e.g., via conventional pupil analysis) or is not focused on the road (e.g., eye focus is on a region other than the road for longer than a predetermined period of time). Galvanic skin response electrodes may be embedded on a steering wheel or other vehicle input to measure perspiration, which user assessment engine 320 may use to assess the user's emotional state.

In some instances, the sensor information from user sensors 160 may be stored in a database for baseline comparison. For instance, user assessment engine 320 may model physiological characteristics (as determined from the sensor information) of a user for baseline purposes. Upon vehicle initiation such as engine ignition or door unlock, user assessment engine 320 may identify a user, such as based on a user's key fob being used to unlock a door or detecting a user's smartphone. Alternatively or additionally, the user may be identified through facial and/or verbal analysis. User assessment engine 320 may obtain the baseline physiological information for the user and compare current physiological characteristics with the baseline physiological characteristics. For example, user assessment engine 320 may model a user's gaze (e.g., position of pupils) over a typical driving session to determine what a "normal" or average gaze is like for a user while driving. Such baseline gaze may be used to compare to a user's current gaze to determine whether the current pupil position deviates beyond an average range, causing user assessment engine 320 to determine that the user is distracted. In another example, a user's speech over time may be stored in the database to infer normal speech of the user, which may be compared to current speech of the user, which may be impaired. If audio analysis suggests that current speech differs from baseline speech beyond a threshold value (which may be defined by a developer or others), user assessment engine 320 may determine that the user is impaired or otherwise in a particular emotional state.

Other types of conventional user cognitive assessments may be used as well.

In an implementation, user assessment engine 320 may obtain environmental sensor information from environmental sensors 150 to infer a user cognitive state. For instance, user assessment engine 320 may determine that the user is weaving in and out of road lanes based on lane tracking image data from vehicle lane keep assist cameras. User assessment engine 320 may infer that the user is distracted or otherwise impaired based on such lane weaving. The user assessment score may be based on the assessment rules and the extent to which the user is weaving lanes.

It should be noted that in any of the foregoing examples, environment assessment engine 310 and/or user assessment engine 320 may be informed by or integrated with vehicle safety systems that monitor lane keeping, perform collision mitigation, and/or other vehicle safety systems.

Adjustment Actions

In an implementation, the adjustment rules may specify actions to take based on various assessment scores (e.g., take a certain action in response to a particular user cognitive assessment score or range of user cognitive assessment scores, take another action in response to another user cognitive assessment score or range of user cognitive assessment scores, etc.). In an implementation, the adjustment rules may specify actions to take based on the existence of certain user cognitive states (e.g., take a certain action if the user is sleepy, take another action if the user is distracted, take yet another action if there exists a road hazard, etc.).

Conversation adjuster 330 may obtain a situational assessment score from situation assessment engine 310 (and/or an indication of the presence of one or more situational states such as a road hazard, bad weather, etc.) and/or a user assessment score from user assessment engine 320 (and/or an indication of the presence to varying degrees of one or more user cognitive states such as the user being cognitively loaded, sleepy, distracted, angry, excited, nervous, etc.). Conversation adjuster 330 may use the adjustment rules to determine whether and what actions should be taken, given the current situational state, user cognitive state, situational assessment scores, and/or user cognitive assessment scores.

In an implementation, conversation adjuster 330 may use a combination of one or more user cognitive states and one or more situational states to determine whether and what action to take. For instance, the adjustment rules may specify that a given action should be taken if the user is sleepy and a road hazard exists and take another action if the user is sleepy and bad weather conditions are present.

In an implementation, conversation adjuster 330 may generate an overall score based on a user cognitive assessment score and a situational assessment score. For instance, the adjustment rules may specify a first weight for the user cognitive assessment score and a second weight for the situational assessment score. The weights in this context may assign a level of importance to the user cognitive assessment score and the situational assessment score. The weights may be determined via various machine learning techniques or may be predefined by a developer or others.

Having described correlation of user cognitive states, situational states, user cognitive assessment scores, and/or environment assessment scores with actions to take, the various actions conversation adjuster 330 may take will now be described. The following and other actions may be taken based on the user cognitive states, situational states, user cognitive assessment scores, and/or environment assessment scores.

In an implementation, conversation adjuster 330 may terminate input to NLP system 106 based on user cognitive states, situational states, user cognitive assessment scores, and/or environment assessment scores. For example, and without limitation, conversation adjuster 330 may not allow the user to input utterances into NLP system 106 when the user is sleepy and/or when cognitive load is high (e.g., when merging onto a highway). In some instances, conversation adjuster 330 may cause NLP system 106 to verbally (or via other output) indicate that the NLP system 106 is not receiving inputs for processing.

In an implementation, conversation adjuster 330 may receive input to NLP system 106, but delay a response until the user cognitive states, situational states, user cognitive assessment scores, and/or environment assessment scores are in condition that the delayed response is no longer required. Put a different way, because conversation management system 108 is continuously monitoring third party information, environmental sensor information, and/or user sensor information, conversation adjuster 330 may continuously evaluate the situation and/or the user to determine whether any action previously taken should no longer be taken (or if another action should be taken). In some instances, if a response is to be delayed, the request may be added to the stack (which maintains previous utterances in a given session), along with any contextual information. In this manner, when NLP is resumed (and the response is no longer to be delayed), any previous conversation that was interrupted may be resumed without loss of contextual information and without the user having to repeat the request.

In an implementation, conversation adjuster 330 may lower threshold scores for a given action to be taken based on a user cognitive state. For instance, if a user is determined to be sleepy, then the threshold value for delaying a response to an utterance may be lowered. In a particular example, if the user is determined to be sleepy, the threshold value relating to road hazards may be lowered such that a less risky road hazard that alone would not cause an action to be taken if the user is not sleepy, may trigger the action to be taken when the user is sleepy.

In an implementation, conversation adjuster 330 may change the personality of a personal assistant of associated with NLP system 106. For example, and without limitation, if the user is determined to have a certain cognitive load, emotion, be in a certain situational state, etc., conversation adjuster 330 may cause the personal assistant to respond with sarcasm, jokes, be more stern, alter prosody, change voices, and/or otherwise alter the behavior of responses from NLP system 106. In this manner, responses of NLP system 106 may be adapted according to the user's cognitive state and/or the situational state.

In an implementation, conversation adjuster 330 may cause alert module 340 to provide an alert relating to a situational state, a user cognitive state, situational assessment scores, and/or user cognitive assessment scores. For instance, such alert may be made to the user via audio, visual, tactile, and/or other output. In some instances, alert module 340 may cause an electronic communication to be transmitted to a contact of the user to inform the contact of the situational state, the user cognitive state, situational assessment scores, and/or user cognitive assessment scores.

Although illustrated as being separate from NLP system 106, some or all of the conversation management system 108 may be incorporated within the NLP system.

Figure 4:
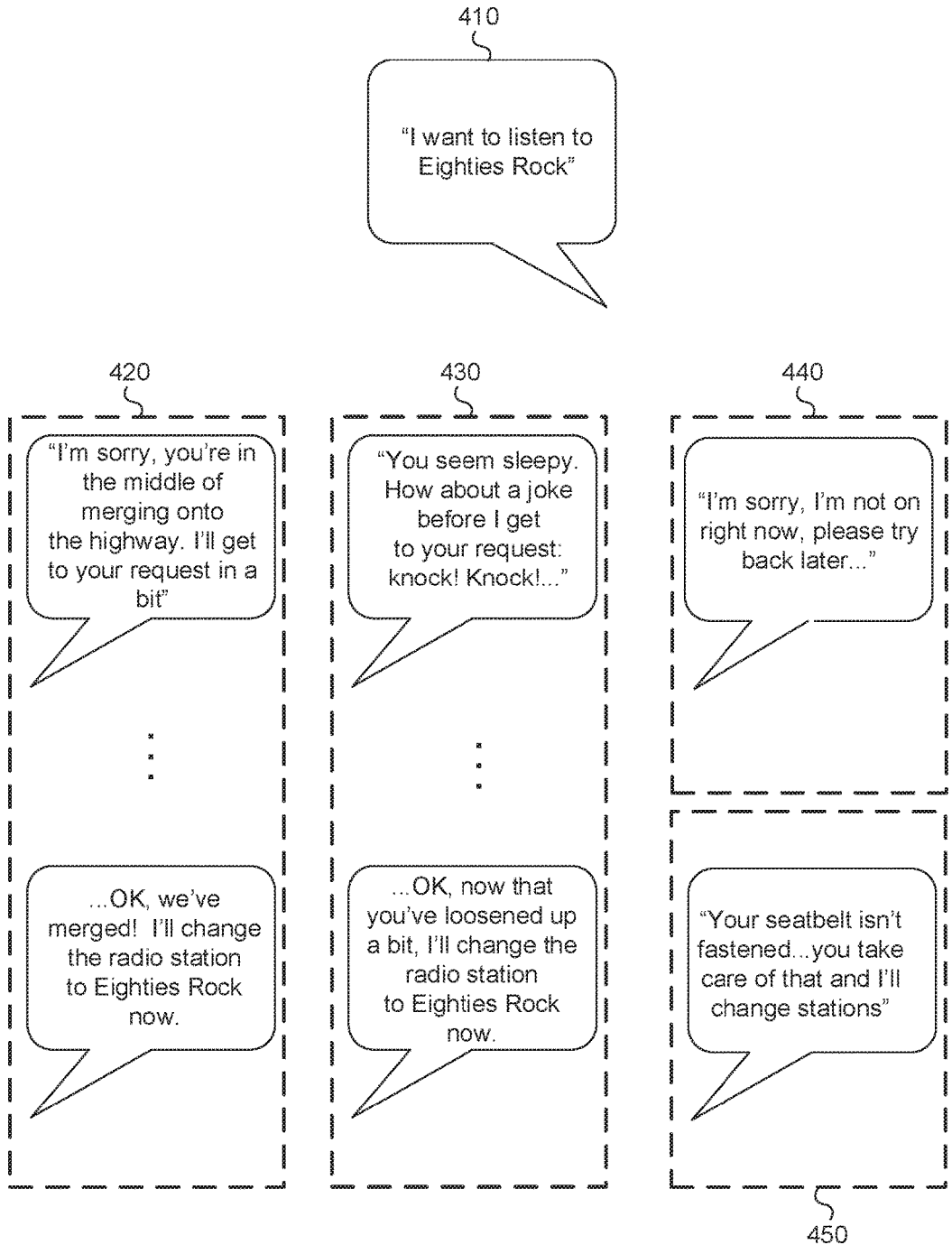
FIG. 4 depicts adjusting a responses from a computer in a natural language conversation between the computer and a user based on a user cognitive state and/or a situational state, according to an implementation of the invention.

FIG. 4 depicts adjusting a responses from a computer in a natural language conversation between the computer and a user based on a user cognitive state and/or a situational state, according to an implementation of the invention.

An utterance (e.g. an uttered request) 410 from a user may be received by system 100. Utterance 410 may include a query and/or a command. NLP system 106 may determine its intent as described herein. Responses 420, 430, 440, and 450 each illustrate a given response based on an action to be taken, as determined by conversation adjuster 330. In other words, responses 420, 430, 440, and 450 are examples of different responses based on different actions to be taken.

Response 420 illustrates an example of conversation adjuster 330 delaying a response (in the example illustrated in FIG. 4, execution of a command) if the utterance 410 is received during a situational state and/or score requires driver attention. For instance, NLP system 106 may indicate to the user that a situational state and/or score requires driver attention and that the response will be handled after the situational state and/or score has changed to an acceptable state or level. In some instances, while the response is delayed, further utterances may be received from the user and added to the stack for later processing. When the situational state and/or score has changed to an acceptable state or level, the utterance 410 (and any intervening utterances) may be processed. The response may be delayed for other reasons (e.g., user cognitive state, user cognitive state score, combination of reasons, etc.) as well.

Response 430 illustrates an example of conversation adjuster 330 changing a personality of NLP system 106 if the utterance 410 is received when the user is determined to be in a certain cognitive state (e.g., sleepy). In the illustrated example, NLP system 106 may introduce jokes or otherwise engage the user in conversation. Other personality changes may occur as well and for other reasons (e.g., based on situational state, situational state scores, combinations of reasons, etc.).

Response 440 illustrates an example of conversation adjuster 330 terminating inputs to NLP 106. In this instance, response 440 may indicate such refusal.

Response 450 illustrates an example of conversation adjuster 330 conditioning a response on a user action. In the illustrated example, the user is required to fasten her seatbelt before a response is provided. Other conditions (e.g., focus on the road) may be required before a response is provided as well. As with other interrupted conversations, conversation adjuster 330 may, in some implementations, continue to receive utterances from the user, but not respond to such utterances. Furthermore, as with other interrupted conversations, conversation adjuster 330 may, in some implementations, perform some or all NLP on the utterances (including determining an intent of an utterance and a corresponding response), but continue to delay providing the response.

Figure 5:
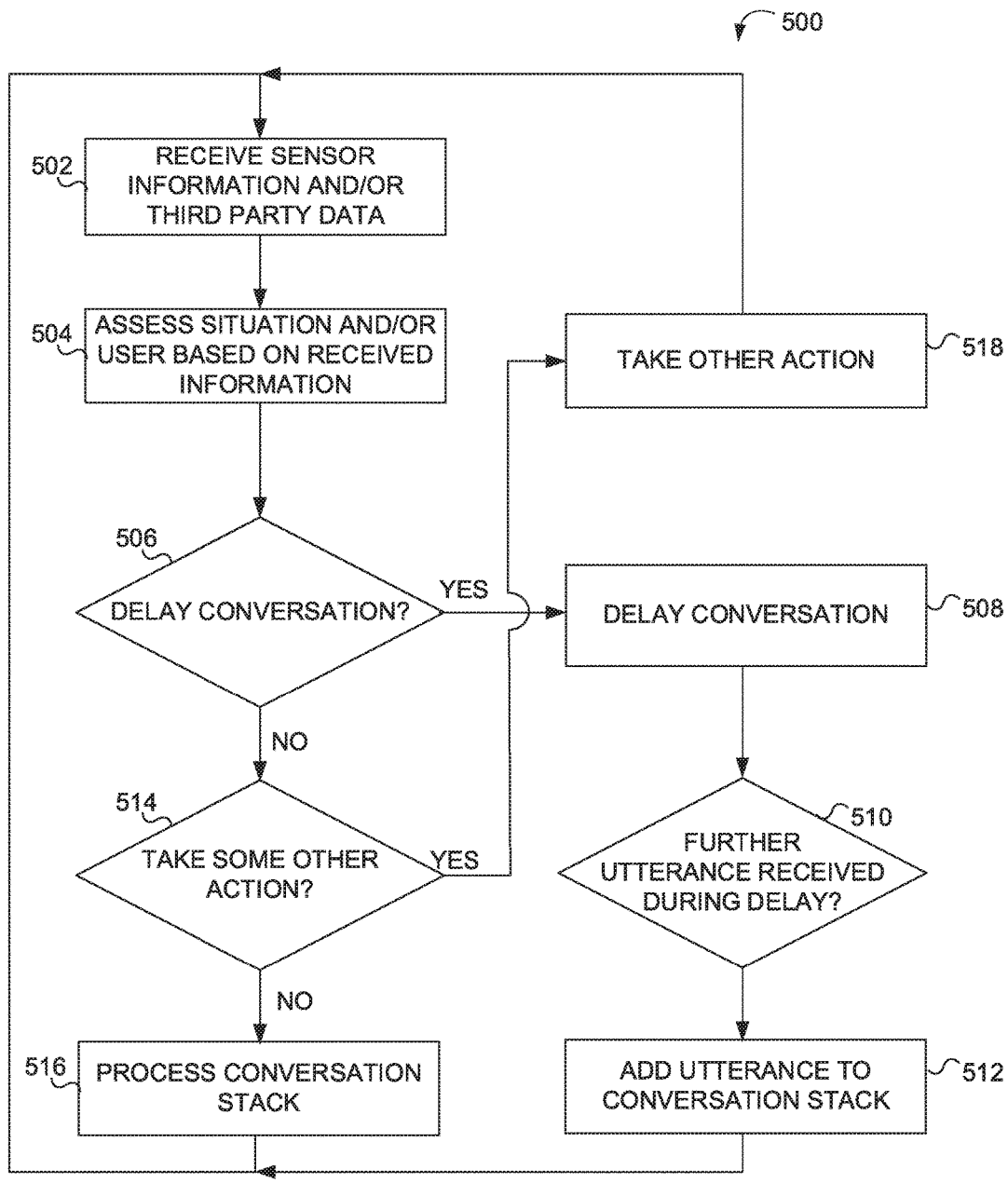
FIG. 5 depicts a process of adjusting natural language conversations between a human user and a computer based on the human user's cognitive state and/or situational state, according to an implementation of the invention.

FIG. 5 depicts a process of adjusting natural language conversations between a human user and a computer based on the human user's cognitive state and/or situational state, according to an implementation of the invention.

The various processing operations and/or data flows depicted in FIG. 5 (and in the other drawing figures) are described in greater detail herein. The described operations may be accomplished using some or all of the system components described in detail above and, in some implementations, various operations may be performed in different sequences and various operations may be omitted. Additional operations may be performed along with some or all of the operations shown in the depicted flow diagrams. One or more operations may be performed simultaneously. Accordingly, the operations as illustrated (and described in greater detail below) are exemplary by nature and, as such, should not be viewed as limiting.

In an operation 502, process 500 may include receiving environmental sensor information, user sensor information, and/or third party data (such as data from traffic sources, weather services, social media, news alerts, etc.).

In an operation 504, process 500 may include assessing the situational state and/or user cognitive state based on the environmental sensor information, user sensor information, and/or third party data. In some instances, the situational state may be assessed separately from the user cognitive state. In some instances, an overall state may be assess based on the situational state and the user cognitive state (and any corresponding scores thereof).

In an operation 506, process 500 may include determining whether the delay conversation with the user based on the assessed situational state and/or user cognitive state (and any corresponding scores thereof).

In an operation 508, responsive to a determination to delay the conversation, process 500 may delay any responses to an utterance. For instance, a response may include an answer to a query included in the utterance and/or an execution of a command included in the utterance.

In an operation 510, process 500 may include determining whether any utterances have been received (from the user) during the delay.

In an operation 512, responsive to a determination that an utterance has been received during the delay, process 500 may include adding the utterance to the conversation stack. In some instances, process 500 may include adding contextual information relating to the utterance to the conversation stack. Furthermore, process 500 may also include determining an intent of the utterance, as well as any response to the utterance, to the conversation stack.

Returning to operation 506, in response to a determination not to delay the conversation, in an operation 514, process 500 may include determining whether to take some other action (such as changing the personality of an NLP system).

In an operation 516, responsive to a determination not to take some other action, the conversation stack may be processed and any corresponding responses may be provided. Processing may then return to operation 502, wherein sensor information and/or third party information is received.

In an operation 518, responsive to a determination to take some other action, the other action may be taken (e.g., a joke may be provided). In some instances, the conversation stack may also be processed in operation 518 as well. Processing may then return to operation 502, wherein sensor information and/or third party information is received. It should be noted that process 500, as illustrated, depicts continuously monitoring situational and/or user states to determine whether to delay conversations with NLP system 106 and/or take other actions. A terminating event (not illustrated) may cause process 500 to terminate. For instance, when process 500 is executing within or in association with a vehicle computer system, then process 500 may terminate when the vehicle is no longer in motion or has been turned off.

The various rules (e.g., adjustment rules) disclosed herein may be separately stored from instructions or may be integrated (e.g., hardcoded) with such instructions. Other implementations, uses and advantages of the invention will be apparent to those skilled in the art from consideration of the specification and practice of the invention disclosed herein. The specification should be considered exemplary only, and the scope of the invention is accordingly intended to be limited only by the following claims.

What is claimed is:

1. A computer implemented method of adjusting natural language conversations between a user and a computer based on the user's cognitive state while operating a vehicle, the method being implemented in the computer having one or more physical processors programmed with computer program instructions that, when executed by the one or more physical processors, cause the computer to perform the method, the method comprising:

identifying, by the computer, a user of the vehicle;

receiving, by the computer, a first utterance from the user during a conversation with the user;

obtaining, by the computer, sensor information relating to at least a first physiological characteristic of the user;

determining, by the computer, a current cognitive state of the user based on the sensor information;

obtaining, by the computer, a baseline cognitive state of the user relating to the first physiological characteristic of the user, the baseline cognitive state of the user being representative of an average cognitive state of the user based on previously obtained, over the course of a plurality of different driving trips, sensor information corresponding to the first physiological characteristic;

comparing, by the computer, the current cognitive state of the user with the baseline cognitive state of the user;

determining, by the computer, that the current cognitive state of the user deviates from the baseline cognitive state of the user beyond a predetermined threshold based on the comparison;

delaying, by the computer, a response to the first utterance based on the determination that the current cognitive state of the user deviates from the baseline cognitive state of the user beyond the predetermined threshold;

placing, by the computer, said first utterance on a conversation stack;

receiving, by the computer, a second utterance from the user while the computer is delaying the response;

adding, by the computer, the second utterance to the conversation stack so that the conversation stack includes the first utterance and the second utterance, thus also delaying a response to the second utterance, and avoiding distracting the user; and processing, by the computer, the second utterance to determine its intent in relation to the first utterance.

2. The method of claim 1, the method further comprising:

obtaining, by the computer, second sensor information relating to at least a second physiological characteristic of the user;

determining, by the computer, a second cognitive state of the user based on the sensor information;

determining, by the computer, that the conversation should be re-engaged with the user based on the second cognitive state of the user; and providing, by the computer, the response to the first utterance in response to determining that the conversation should be re-engaged with the user.

3. The method of claim 1, the method further comprising:
altering, by the computer, a behavior of the computer, other than delaying the response, based on the cognitive state.

4. The method of claim 3, wherein altering the behavior comprises:
providing, by the computer, a joke instead of the response based on the current cognitive state.

5. The method of claim 1, the method further comprising:
obtaining, by the computer, information relating to the vehicle or its surroundings; and
determining, by the computer, a situational state based on the information relating to the vehicle or its surroundings,
wherein delaying the response is based further on the situational state.

6. The method of claim 5, wherein the information relating to the vehicle or its surroundings comprises global positioning system (GPS) information that indicates a current location of the vehicle.

7. The method of claim 6, wherein determining the situational state comprises:
obtaining location information comprising one or more coordinates that define a location that requires heightened driver attention; and
determining that the current location of the vehicle corresponds to the location based on the location information, wherein the situational state is based further on the determination that the current location of the vehicle corresponds to the locations.

8. The method of claim 5, the method further comprising: providing, by the computer, a natural language alert to the user based on the cognitive state of the user or based on the current situational state.

9. The method of claim 5, wherein delaying the response to the first utterance further comprises:
obtaining, by the computer, a first predefined threshold relating to the situational state, the first predefined threshold corresponding to a threshold that if deviated from by an amount will trigger the delaying;
altering, by the computer, the first predefined threshold to generate a second predefined threshold responsive to the determination that the current cognitive state of the user deviates from the baseline cognitive state of the user beyond a predetermined threshold;
comparing, by the computer, the situational state with the second predefined threshold; and
determining, by the computer, that the situational state deviates from the second predefined threshold by at least the amount, wherein delaying the response is based on the determination that the situational state deviates from the second predefined threshold by at least the amount.

10. The method of claim 1, wherein the vehicle comprises an automobile and wherein the computer is integrated with the automobile.

11. The method of claim 1, wherein identifying the user of the vehicle occurs in association with a startup of the vehicle and includes:
identifying, by the computer, a key fob used to access the vehicle; and
associating, by the computer, an identity of the user with the key fob.

12. The method of claim 1, wherein identifying the user of the vehicle occurs in association with a startup of the vehicle and includes:
obtaining, by the computer, pre-stored biometric information associated with the user;
obtaining, by the computer, sensor information indicating biometric information of the user; and
comparing, by the computer, the pre-stored biometric information with the biometric information, wherein the identification of the user is based on the comparison of the pre-stored biometric information with the biometric information.

13. The method of claim 1, wherein identifying the user of the vehicle occurs in association with a startup of the vehicle and includes:
identifying, by the computer, a user device communicably coupled to the vehicle; and
associating, by the computer, an identity of the user with the user device.

14. The method of claim 1, the method further comprising:
updating, by the computer, the baseline cognitive state of the user based on the sensor information relating to the first physiological characteristic of the user.

15. The method of claim 1, wherein the first physiological characteristic of the user comprises at least one of a pupil position of the user or a speech of the user.

16. The method of claim 1, wherein delaying the response to the first utterance comprises:
obtaining, by the computer, one or more adjustment rules that each specify actions to take in response to a corresponding cognitive state of the user; and
selecting, by the computer, an adjustment rule based on the current cognitive state of the user, wherein the selected adjustment rule specifies that responses to user utterances should be delayed.

17. A system of adjusting natural language conversations between a user and a computer based on the user's cognitive state while operating a vehicle, the system comprising:
a computer comprising one or more physical processors programmed with computer program instructions that, when executed by the one or more physical processors, cause the computer to:
identify a user of the vehicle;
receive a first utterance from the user during a conversation with the user;
obtain sensor information relating to at least a first physiological characteristic of the user;
determine a current cognitive state of the user based on the sensor information;
obtain a baseline cognitive state of the user relating to the first physiological characteristic of the user, the baseline cognitive state of the user being representative of an average cognitive state of the user based on previously obtained sensor information, over the course of a plurality of different driving trips, corresponding to the first physiological characteristic;
compare the current cognitive state of the user with the baseline cognitive state of the user;
determine that the current cognitive state of the user deviates from the baseline cognitive state of the user beyond a predetermined threshold based on the comparison;
delay a response to the first utterance based on the determination that the current cognitive state of the user deviates from the baseline cognitive state of the user beyond the predetermined threshold;
place said first utterance on a conversation stack;
receive a second utterance from the user while the response is delayed by the computer;

add the second utterance to the conversation stack so that the conversation stack includes the first utterance and the second utterance, and thus also delays a response to the second utterance, and avoids distracting the user; and process the second utterance to determine its intent in relation to the first utterance.

18. The system of claim 17, wherein the computer is further programmed to:

obtain second sensor information relating to at least a second physiological characteristic of the user;

determine a second cognitive state of the user based on the sensor information; determine that the conversation should be re-engaged with the user based on the second cognitive state of the user; and provide the response to the first utterance in response to the determination that the conversation should be re-engaged with the user.

19. The system of claim 17, wherein the computer is further programmed to:

alter a behavior of the computer, other than delay the response, based on the cognitive state.

20. The system of claim 19, wherein to alter the behavior, the computer is further programmed to:

provide a joke instead of the response based on the current cognitive state.

21. The system of claim 17, wherein the computer is further programmed to:

obtain information relating to the vehicle or its surroundings; and determine a situational state based on the information relating to the vehicle or its surroundings, wherein to delay the response is based further on the situational state.

22. The system of claim 21, wherein the information relating to the vehicle or its surroundings comprises global positioning system (GPS) information that indicates relating to a current location or heading indicating heightened driver attention is required of the vehicle.

23. The system of claim 22, wherein to determine the situational state, the computer is further programmed to:

obtain location information comprising one or more coordinates that define a location that requires heightened driver attention, and determine that the current location of the vehicle corresponds to the location based on the location information, wherein the situational state is based further on the determination that the current location of the vehicle corresponds to the locations.

24. The system of claim 21, wherein the computer is further programmed to:

provide a natural language alert to the user based on the current cognitive state of the user or based on the situational state.

25. The system of claim 17, wherein the vehicle comprises an automobile and wherein the computer is integrated with the automobile.

* * * * *